March 31, 1964  D. C. KLAWITTER  3,127,151
TENSION DEVICE

Filed April 10, 1961  4 Sheets-Sheet 1

INVENTOR:
DELMAR C. KLAWITTER
BY John F. Schmidt

March 31, 1964 D. C. KLAWITTER 3,127,151
TENSION DEVICE
Filed April 10, 1961 4 Sheets-Sheet 2
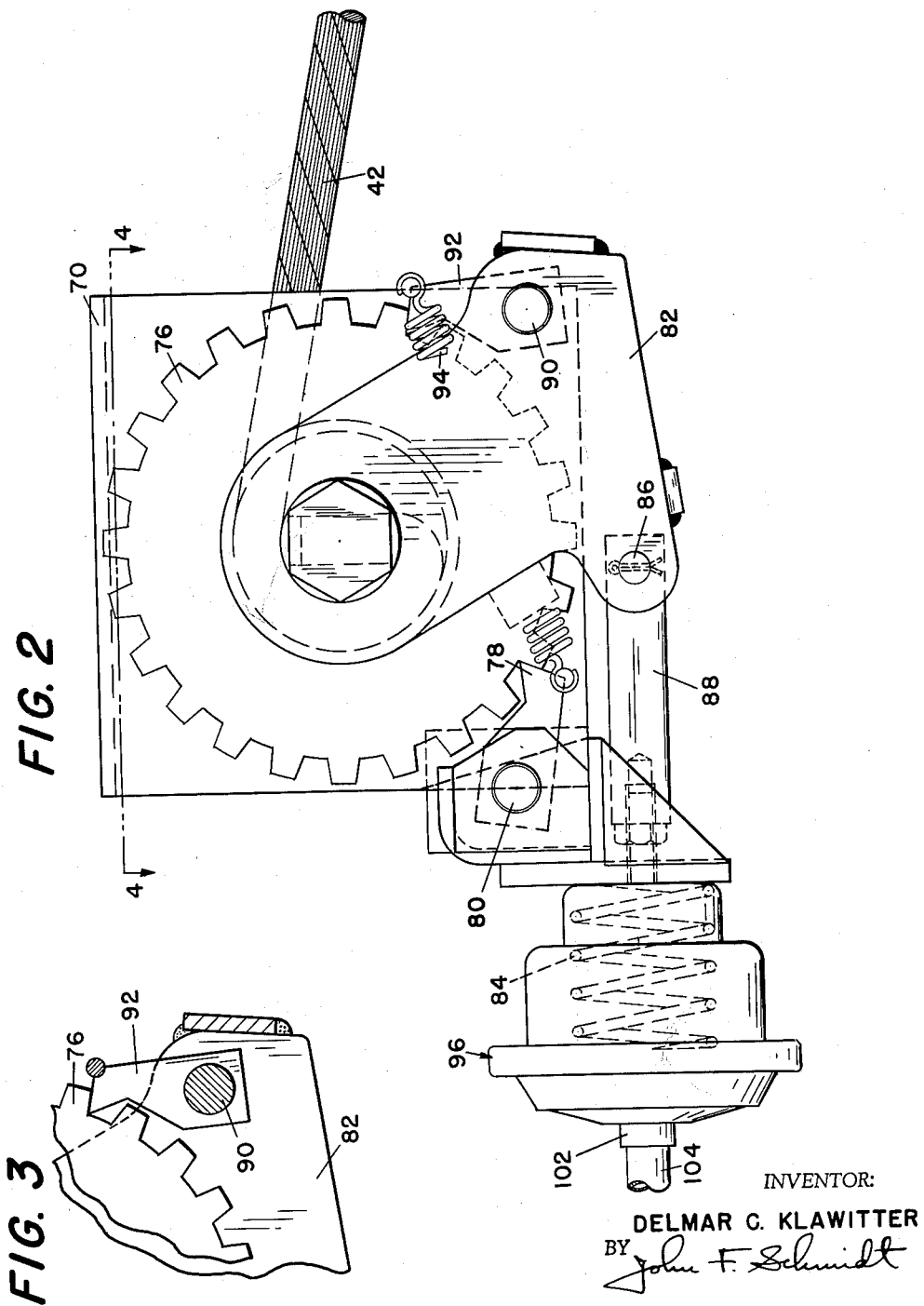
INVENTOR:
DELMAR C. KLAWITTER
BY John F. Schmidt March 31, 1964 D. C. KLAWITTER 3,127,151
TENSION DEVICE Filed April 10, 1961 4 Sheets-Sheet 3

INVENTOR:
DELMAR C. KLAWITTER
BY John F. Schmidt

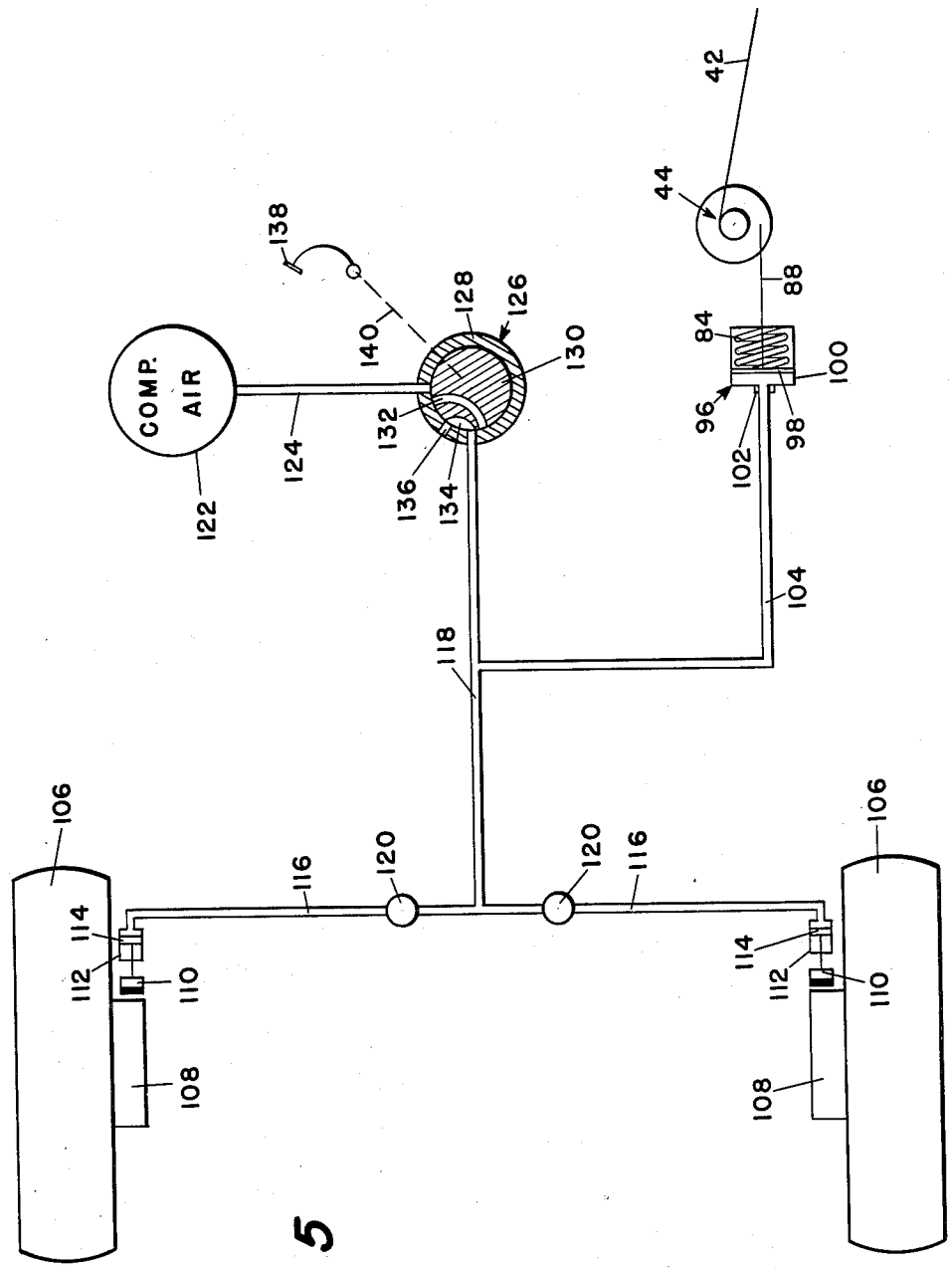

United States Patent Office 3,127,151
Patented Mar. 31, 1964

3,127,151
TENSION DEVICE
Delmar C. Klawitter, Peoria, Ill., assignor to LeTourneau-Westinghouse Company, Peoria, Ill., a corporation of Illinois
Filed Apr. 10, 1961, Ser. No. 101,963
12 Claims. (Cl. 254—164)

This invention relates to a tension device for a cable system; more specifically, the invention pertains to a tension device for such a system that depends for its operation on another device that is functionally unrelated to the cable system.

This invention is an improvement on the tension device disclosed and claimed in patent application Serial Number 62,281 of Hoyt W. Smith, filed October 12, 1960, now Patent No. 3,083,949 and assigned to the assignee of this invention. In one sense, this invention is an entirely new approach to the problem of keeping a cable tight.

As in the cable system of the above-identified application, the cable system here shown is one in which the thing moved by the cable is moved in both directions, positively, by the cable. Accordingly, some means are required, as the cable acquires a permanent "stretch," to keep the cable tight or, putting it another way, take up the slack which would otherwise result.

Many slack take-up means are shown in the prior art, but too many such means rely on special attention by the operator or by maintenance personnel, which attention is sometimes overlooked to the detriment of the equipment. Such neglect may be due either to the difficulty of operating a slack take-up means, or simply to the fact that taking up the slack requires a special, conscious effort by somebody. The latter cause of neglect is removed by combining the cable tightening function with the operation of a device that is functionally unrelated to the cable system and which, in the normal use of the entire machine, must be operated with a greater frequency than is required for adequate operation of the slack take-up device.

It is accordingly an object of this invention to provide a cable tightener for the cable of a cable-operated mechanism in which no special thought or attention need be devoted to the cable system, but in which the necessary operation of a device functionally unrelated to the cable-operated system serves to actuate a device to keep the cable tight. Other objects will be apparent to those skilled in the art, after a careful consideration of the device here disclosed and claimed.

In the drawings:

FIG. 2 is a detailed view on a much larger scale, showing the slack take-up device in elevation;

FIG. 3 is a view of a portion of the device shown in FIG. 2, being a view in section on line 3—3 of FIG. 4;

FIG. 5 is a schematic drawing showing the means by which the slack take-up device and the functionally unrelated device are controlled or operated.

Figure 1:
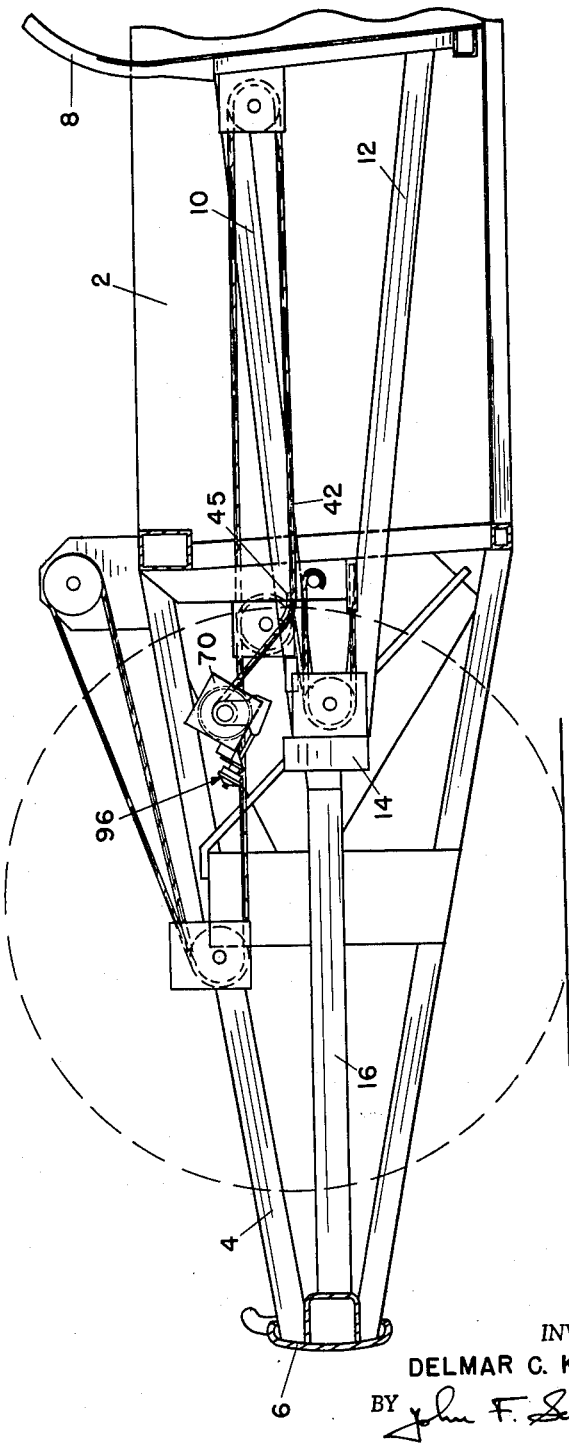
FIG. 1 is a somewhat schematic side elevation view, with parts broken away, of a machine using a cable system of the type here described. The machine shown is what is commonly known in the earthmoving art as a scraper.

Those skilled in the art of earthmoving will recognize the machine shown in FIG. 1 as a carrying type scraper having a bowl 2, a pusher frame 4 secured to the rear of the bowl 2, and a push plate 6 at the rear of the pusher frame 4. The bowl 2 and the framework 4 to the rear of the bowl provide the basic support for the cable system to which this invention applies, and these structural parts will be understood to constitute a support generally.

A tailgate and its operating mechanism are carried by the support, the tailgate being indicated at 8 and being movable forward and back in the scraper bowl 2. A tailgate operating frame is secured to the rear of the tailgate and as shown here comprises a pair of arms 10 and 12 which converge toward the rear where they are secured at their ends to a sheave block 14. Sheave block 14 reciprocates, right and left as seen in FIG. 1, on a rail 16. It will be understood that the two arms 10 and 12 are below the plane of the paper and that there is another pair of like arms above the plane of the paper.

A cable system is provided to move the tailgate 8, the arms 10 and 12, and the sheave block 14 to the right relative to the support, in what may be called a forward stroke, and to the left in a return stroke. For a better understanding of this cable system, reference may be had to the drawings and description of the above-identified application of Hoyt W. Smith, and especially to FIG. 4 of that application and the description thereof. Inasmuch as the cable system itself shown in this case is the same as the cable system shown in the above-identified co-pending application, there will be no need to repeat the description of the cable system here.

As is pointed out in the above-identified application, a length of cable designated as 42 is reeved toward the rear of the scraper where it is dead-ended on a movable dead end connection. More specifically, a spool 44 is provided with an opening which serves as a dead end connection to receive the end of the cable seen in FIGS. 2 and 4. In the embodiment here shown, as is best seen in FIG. 1, cable length 42 passes under a cable guide 45 which slants the cable upward toward spool 44.

Figure 4:
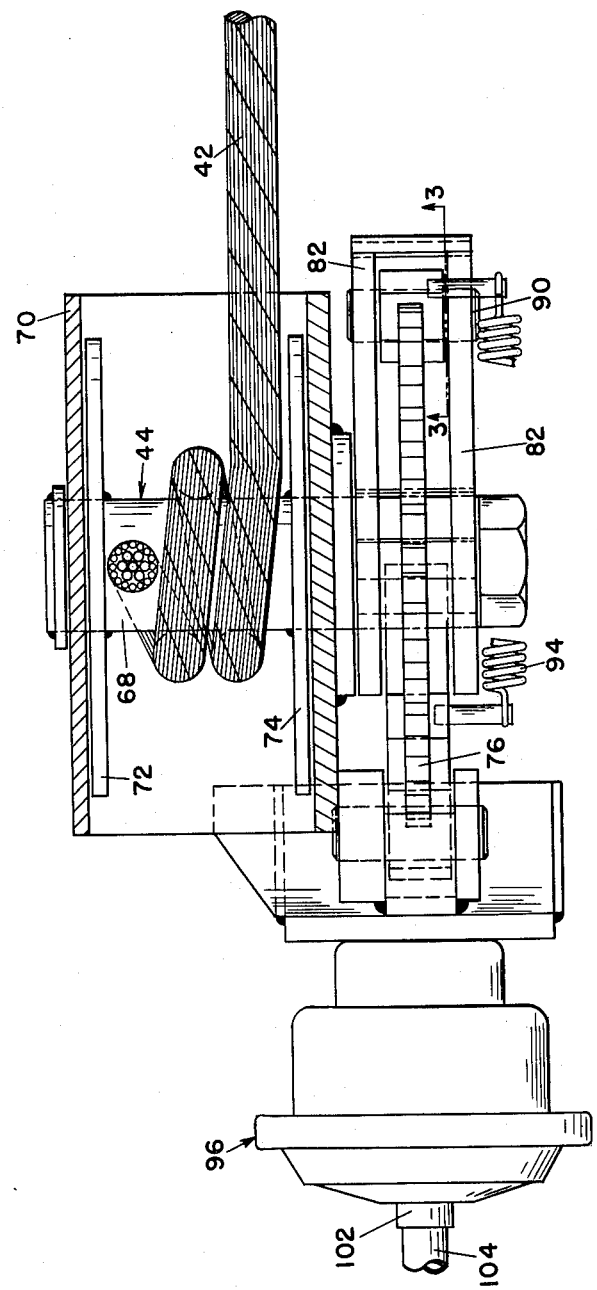
FIG. 4 is largely a top plan view of the device shown in FIG. 2, being a view in section on line 4—4 of FIG. 2.

As is best seen in FIGS. 2-4, spool 44 consists of a shaft 68 which is rotatable in a housing 70. Inside the housing 70, flanges 72 and 74 are secured in any suitable manner to the shaft 68, and in effect, make a spool of the portion of the shaft 68 which is between the flanges. As is probably best seen in FIG. 2, and as indicated above, the cable passes through an opening in the shaft 68, and is secured in the opening in any suitable manner.

Outside the housing 70, the shaft 68 is provided with a toothed wheel 76. Wheel 76 is secured in any suitable manner to the shaft so that driving or rotation of toothed wheel 76 rotates the shaft 68.

Toothed wheel 76 is part of a ratchet means which is provided to keep the cable tight. A holding pawl 78 is pivotally mounted on the outside of the housing 70 as shown at 80. An actuator is provided to move the ratchet wheel or toothed wheel 76 and its connected shaft 68 in order to tighten the cable. More specifically, the actuator comprises an arm 82 which is pivotally mounted on the shaft 68. As is best seen in FIG. 4, arm 82 is a bifurcated member of which the two parts extend on opposite sides of the toothed wheel 76. A spring 84 biases the arm 82 clockwise or downward as seen in FIG. 2. Between the bifurcated members of the arm 82, there is secured a pin 86 to which a link 88 is connected. The bifurcated parts of arm 82 further carry a shaft 90 on which a second pawl 92 is pivotally mounted in close proximity to the toothed wheel 76 and engageable with the teeth thereof. A suitable spring 94 is provided to bias the two pawls 78 and 92 into engagement with the teeth of toothed wheel 76. In the embodiment shown, the spring 94 is secured at its one end to the pawl 78 and at its other end to the pawl 92; thus, spring 94 serves to bias both of the pawls into engagement with the toothed wheel.

Spring 84, pin 86, and link 88 are parts of means to operate the slack take-up means. More specifically, a fluid pressure operated motor is indicated generally at 96. In a preferred embodiment of the invention, motor 96 may be any one of a number of suitable air motors of the expansible chamber type. Such a motor could be a diaphragm type of device or could be a piston-and-cylinder device. The latter type of device is shown in the schematic drawing which constitutes FIG. 5, wherein a piston 98 is reciprocable in a cylinder 100 against the bias of spring 84. A connection 102 is adapted to receive a fluid conduit 104 through which fluid under pressure is admitted to the motor means 96.

Reference was made above to the desirability of making the operation of the cable tightening device depend upon the operation of a device functionally unrelated to the cable operated mechanism. In a scraper of the type here shown, the functionally unrelated device could be one of a number of such devices, as for example the apron operating mechanism (not shown here), or the braking system which is illustrated here schematically. More specifically, the cable operated mechanism in this embodiment is mounted on a wheeled vehicle. Two of the wheels of such a vehicle are shown at 106, and brakes for wheels 106 are shown schematically in FIG. 5 as comprising brake drums 108 and brake shoes 110. Thus, in the embodiment here shown, the brakes constitute the "device functionally unrelated to" the cable operated mechanism referred to in the claims and in the foregoing description. It will of course be understood by those skilled in the art that the brakes require frequent actuation. Fluid pressure operated means are provided in this embodiment to actuate the brakes. As here shown, each brake is actuated by a conventional compressed air motor having a cylinder 112 and a piston 114 reciprocable in the cylinder. Piston 114 is connected in any suitable manner to operate the brake shoe 110. Such details as springs, cams, and the like are well known to those skilled in the brake art and need not be detailed here, it being understood that the showing in FIG. 5 is schematic and is provided to illustrate the principle involved.

Branch fluid conduits 116 are connected with a main pressure conduit 118, preferably through quick-release valves 120, valves 120 being of any suitable type as, for example, shown in Patent 2,040,580, issued May 12, 1936 to Stephen Vorech.

A source of compressed air 122 is provided for the air motor 96 and the air motors to operate the brakes. More specifically, compressed air source 122 is connected with main pressure conduit 118 by means of a conduit 124 and an operator-operable valve 126. Valve 126 consists of a housing 128 and a valve element 130 rotatable in housing 128 and having two air passages 132 and 134. An opening 136 in the housing 128 connects the interior of housing 128 with the atmosphere. Valve element 130 is turned from one operating position to another by a brake pedal 138 connected with the element 130 by any suitable connection here shown schematically at 140.

As is apparent in FIG. 5, conduit 104 connects with the main line conduit 118, so that any time conduit 118 is under pressure, conduit 104 is likewise under pressure.

*Operation*

It will be appreciated by those skilled in the art of earthmoving that the brakes of a vehicle like the scraper here shown are necessarily operated a great many times during operation of the machine. It will further be understood that the frequency of operation of the brakes is such that the concurrent operation of motor 96 will be much greater than will be required to keep the cable tight.

It will further be understood from the foregoing description to those skilled in the art that the brakes and their operation are not related functionally to the cable-operated system which is here shown to move the scraper tailgate 8 back and forth. In view thereof, no conscious or separate effort to keep the cable tensioned at a desirable level is required by the scraper operator or by any maintenance personnel. Instead, a single operator-operable controlled means which is necessary for the proper function and control of the "functionally unrelated device" (the brakes) here serves, entirely automatically, to keep the cable free from slack.

More specifically, every time that the operator applies the brakes, as for example by depressing the pedal 138, valve element 130 is rotated from the operating position shown in FIG. 5 into an operating position in which passage 132 connects conduit 124 with conduit 118. This is a motion he goes through for the purpose of braking the vehicle and it is a motion which is wholly unrelated to his operation of the tailgate mechanism. Each time that pressure is thus admitted to main line conduit 118, pressure is also admitted to the pressure operated means 96 by way of conduit 104. If the combination of cable tension and resistance offered by spring 84 is greater than the force which can be applied by piston 98 at the pressure available, no significant operation of the slack take-up means takes place. At most, toothed wheel 76 rotates through an arc that is something less than the space from tooth center to tooth center.

If the tension in the cable has been reduced considerably due to stretch of the cable beyond the elastic limit, then the expansible chamber device 96 will move link 88 to the right as seen in FIG. 2, arm 82 is pivoted counterclockwise about the axis of shaft 68, and pawl 92 turns the toothed wheel 76 counterclockwise until holding pawl 78 engages the next tooth. Then, when the operator takes his foot off the brake pedal 138, valve element 130 turns counterclockwise enough to disconnect the conduits 124 and 118 and connects conduit 118 with the atmosphere vent 136 by way of passage 134. The high pressure side of expansible chamber device 96 is thereupon vented to atmospheric pressure, and spring 84 returns the parts to substantially the position shown in FIG. 2.

In the manner explained, the tension in the cable is automatically maintained at a proper level without a conscious effort by the operator directed to that purpose. Instead, by actuating a single control means, namely the brake 138 and valve 126, in a conscious effort which has no connection with cable tension, the operator keeps the tension from dropping below a predetermined minimum and thus prevents the accumulation of slack in the cable which could result in damage to the equipment.

It will be evident from the foregoing that this invention provides a simple and effective means to maintain tension in the cable of a cable-operated system, and that this means is in no way dependent upon conscious effort by the operator directed to that purpose. Other advantages will be apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. In a vehicle for a cable-operated mechanism and having a ground engaging element, a brake for the ground engaging element, slack take-up means for the cable of the cable-operated mechanism, means to actuate said brake, and means actuable in response to operation of the brake actuating means to operate the slack take-up means to take up slack in said cable.

2. In a wheeled vehicle for a cable-operated mechanism, brakes for the wheels, fluid pressure operated means to actuate the brakes, slack take-up means for the cable of the cable-operated mechanism, means to supply fluid under pressure to the brake actuating means and including an operator-operable valve, and fluid pressure means, actuable in response to operation of said valve, to operate the slack take-up means to take up slack in the cable.

3. In a wheeled vehicle for a cable-operated mechanism, brakes for the wheels, fluid pressure operated means to actuate the brakes, a movably mounted dead end connection for a cable, means anchoring the cable of the cable-operated mechanism on the dead end connection, means to supply fluid under pressure to the brake actuating means and including an operator-operable valve, and fluid pressure means, actuable in response to operation of said valve, to move the dead end connection to tighten the cable.

4. In a wheeled vehicle for a cable-operated mechanism, brakes for the wheels, fluid pressure operated means to actuate the brakes, slack take-up means for the cable of the cable-operated mechanism including a pawl and ratchet device, means to supply fluid under pressure to the brake actuating means and including an operator-operable valve, and fluid pressure means, actuable in response to operation of the valve, to operate the slack take-up means to take up slack in the cable.

5. In a wheeled vehicle for a cable-operated mechanism, brakes for the wheels, fluid pressure operated means to actuate the brakes, means in engagement with the cable of said mechanism and movable to keep the cable tight, a toothed wheel operable and connected to move the last-named means in a cable tightening direction, means to supply fluid under pressure to the brake actuating means and including a control device, and fluid pressure mechanism engaging the teeth of the toothed wheel, and actuable in response to operation of the control device, to operate the toothed wheel to keep the cable tight.

6. In a wheeled vehicle for a cable-operated mechanism: brakes for the wheels; fluid pressure operated means to actuate the brakes; a rotatably mounted spool; means mounting an end of the cable of said mechanism on said spool; an intermittently operated device to turn the spool, comprising a wheel rotatably mounted and connected to wind cable onto the spool for a given direction of rotation, means engaging the wheel and holding it against rotation counter to said given direction, and other means engaging the wheel and operable to rotate the wheel in said given direction; means to supply fluid under pressure to the brake actuating means and including a control device; and a fluid pressure motor, actuable in response to operation of the control device, to operate said other engaging means.

7. In combination, a cable-operated mechanism, a device functionally unrelated to said mechanism and requiring frequent actuation, slack take-up means for the cable of said mechanism, means to actuate said device, and means actuable in response to operation of the device actuating means to operate the slack take-up means to take up slack in the cable.

8. In combination, a cable-operated mechanism, a device functionally unrelated to said mechanism and requiring frequent actuation, first fluid pressure operated means to actuate said device, slack take-up means for the cable of said mechanism, means to supply fluid under pressure to said first fluid pressure operated means and including an operator-operable valve, and second fluid pressure means, actuable in response to operation of said valve, to actuate the slack take-up means.

9. The combination as in claim 8, in which the slack take-up means includes a movably mounted dead end connection for a cable, and means anchoring the cable of said mechanism on the dead end connection.

10. A combination as in claim 8, in which the slack take-up means includes a pawl and ratchet device.

11. In combination, a cable-operated mechanism, a device functionally unrelated to said mechanism and requiring frequent actuation, means in engagement with the cable of said mechanism and movable to keep the cable tight, a toothed wheel operable and connected to move the last-named means in a cable tightening direction, means connected for actuating said device and including a control device, and means engaging the teeth of said wheel, actuable in response to operation of the control device, to operate the wheel to tighten the cable.

12. In combination: a cable-operated mechanism; a device functionally unrelated to said mechanism and requiring frequent actuation; means to actuate said device; a rotatably mounted spool; means mounting one end of the cable of said mechanism on the spool; intermittently operated means to turn the spool, comprising a wheel rotatably mounted and connected to wind cable onto the spool for a given direction of rotation, means engaging the wheel and holding it against rotation counter to said given direction, and other means engaging the wheel and operable to rotate the wheel in said given direction; operator-operable controlled means for the means to actuate said device; and means, actuable in response to operation of the controlled means, to operate said other engaging means to tighten the cable.

References Cited in the file of this patent

UNITED STATES PATENTS

| | | |
|---|---|---|
| 2,464,039 | Howell | Mar. 8, 1949 |
| 2,650,713 | Nigh | Sept. 1, 1953 |

UNITED STATES PATENT OFFICE
CERTIFICATE OF CORRECTION

Patent No. 3,127,151                                      March 31, 1964

Delmar C. Klawitter

It is hereby certified that error appears in the above numbered patent requiring correction and that the said Letters Patent should read as corrected below.

Column 3, line 50, for "120" read -- 130 --.

Signed and sealed this 28th day of July 1964.

(SEAL)

Attest:

ESTON G. JOHNSON
Attesting Officer

EDWARD J. BRENNER
Commissioner of Patents